(12) United States Patent
Semlani et al.

(10) Patent No.: US 10,083,488 B2
(45) Date of Patent: Sep. 25, 2018

(54) PURCHASING CONTACT INFORMATION FROM AN ELECTRONICALLY DISPLAYED MAP

(71) Applicant: salesforce.com, inc., San Francisco, CA (US)

(72) Inventors: Latesh Semlani, Fremont, CA (US); Ankit Modi, Fremont, CA (US); Tarundeep Batra, Fremont, CA (US)

(73) Assignee: salesforce.com, inc., San Fransico, CA (US)

( * ) Notice: Subject to any disclaimer, the term of this patent is extended or adjusted under 35 U.S.C. 154(b) by 598 days.

(21) Appl. No.: 14/521,796

(22) Filed: Oct. 23, 2014

(65) Prior Publication Data
US 2016/0117780 A1    Apr. 28, 2016

(51) Int. Cl.
| | |
|---|---|
| *G06Q 20/12* | (2012.01) |
| *G06Q 40/00* | (2012.01) |
| *G06Q 30/00* | (2012.01) |
| *G06F 17/30* | (2006.01) |

(52) U.S. Cl.
CPC ....... *G06Q 40/12* (2013.12); *G06F 17/30345* (2013.01); *G06Q 20/12* (2013.01); *G06Q 20/123* (2013.01); *G06Q 30/01* (2013.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

U.S. Appl. No. 13/998,890.

(Continued)

*Primary Examiner* — Paul Danneman
(74) *Attorney, Agent, or Firm* — Dergosits & Noah LLP; Todd A. Noah

(57) ABSTRACT

A method and system for adding contact information to a user account in a database. A registered user of the database presents a query having search criteria. The search criteria identifies records that have contact information including an address located within a defined distance of a specified location, such as the user's current location. Instructions are transmitted to the client device for rendering a map of the specified location and a representation of the search results on a display of the user's device. If a record is not owned by or associated with the user, the contact information is obscured on the display. A widget is configured on the display of obscured records that enables the user to purchase the record. Upon selection of the widget, a purchase transaction is executed, and the identified record is added to the user account.

17 Claims, 11 Drawing Sheets

(56) References Cited

U.S. PATENT DOCUMENTS

| | | |
|---|---|---|
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier |
| 6,654,032 B1 | 11/2003 | Zhu |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,340,411 B2 | 3/2008 | Cook |
| 7,356,482 B2 | 4/2008 | Frankland et al. |
| 7,401,094 B1 | 7/2008 | Kesler |
| 7,620,655 B2 | 11/2009 | Larsson |
| 7,698,160 B2 | 4/2010 | Beaven et al. |
| 7,779,475 B2 | 8/2010 | Jakobson et al. |
| 7,851,004 B2 | 12/2010 | Hirao et al. |
| 8,010,663 B2 | 8/2011 | Firminger et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven et al. |
| 8,095,594 B2 | 1/2012 | Beaven et al. |
| 8,209,308 B2 | 6/2012 | Jakobson et al. |
| 8,275,836 B2 | 9/2012 | Beaven et al. |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian P et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2004/0001092 A1 | 1/2004 | Rothwein et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0018888 A1* | 1/2009 | Zamani ............ G06Q 10/0637 705/7.36 |
| 2009/0063415 A1 | 3/2009 | Chatfield et al. |
| 2009/0100342 A1 | 4/2009 | Rueben et al. |
| 2009/0177744 A1 | 7/2009 | Marlow et al. |
| 2011/0066494 A1* | 3/2011 | Smith ................. G07F 11/54 705/14.49 |
| 2012/0233137 A1 | 9/2012 | Jakobson et al. |
| 2013/0218948 A1 | 8/2013 | Jakobson |
| 2013/0218949 A1 | 8/2013 | Jakobson |
| 2013/0218966 A1 | 8/2013 | Jakobson |
| 2015/0220944 A1* | 8/2015 | Fackrell ............ G06Q 30/0201 705/7.29 |
| 2015/0248663 A1* | 9/2015 | Meere ................ G06Q 20/3274 705/17 |

OTHER PUBLICATIONS

U.S. Appl. No. 13/987,075.
U.S. Appl. No. 13/987,074.
U.S. Appl. No. 13/998,065.
U.S. Appl. No. 13/986,744.
U.S. Appl. No. 13/986,251.

* cited by examiner

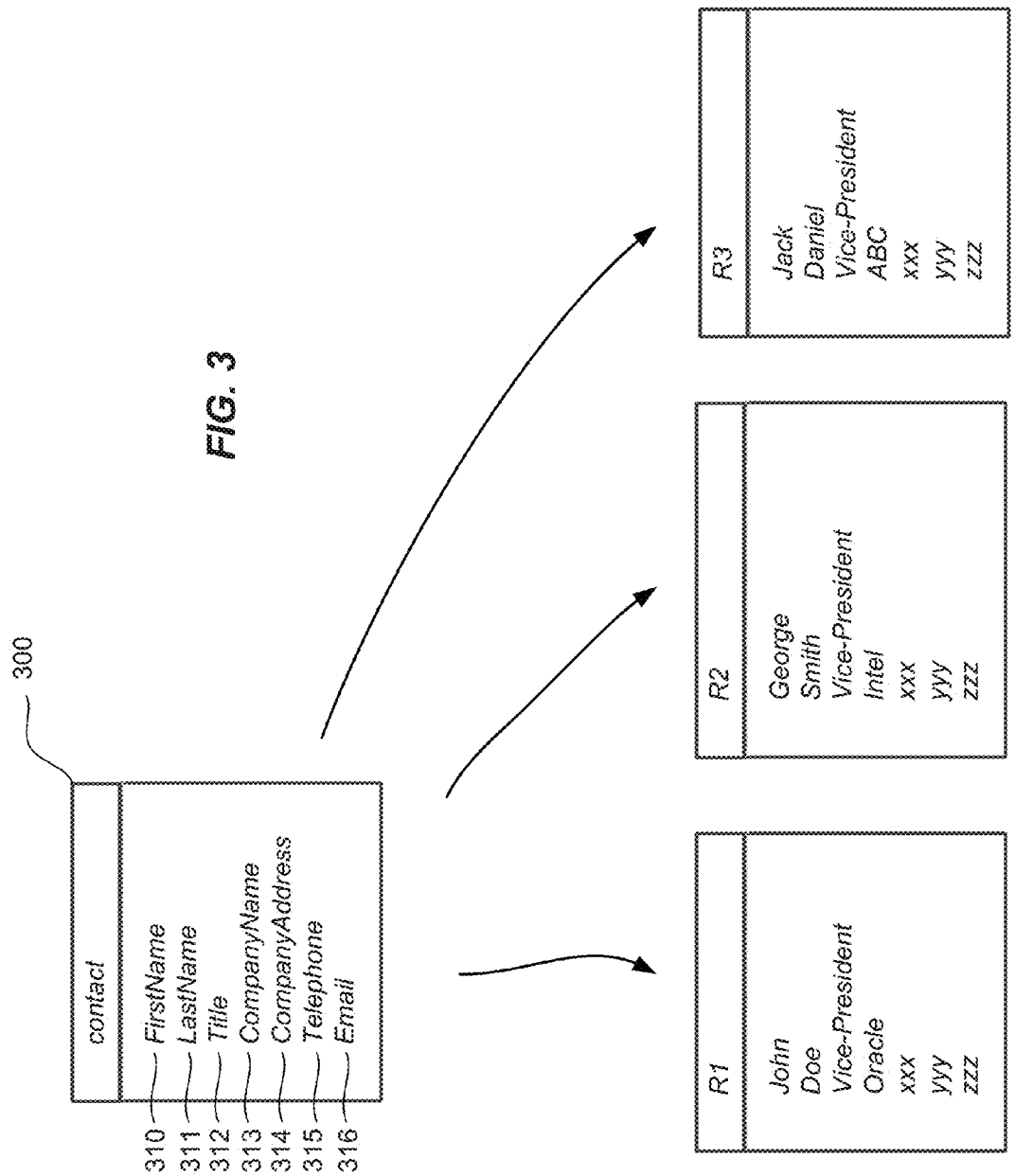

| | [FirstName] | [LastName] | [Title] | [Company] | • • • |
|---|---|---|---|---|---|
| R1 | [John] | [Doe] | [Vice-President, Sales] | [Oracle] | • • • |
| R2 | [George] | [Smith] | [Vice-President, Engineering] | [Intel] | • • • |
| R3 | [Jack] | [Daniel] | [Vice-President, Legal] | [ABC] | • • • |
| | • • • | • • • | • • • | • • • | |

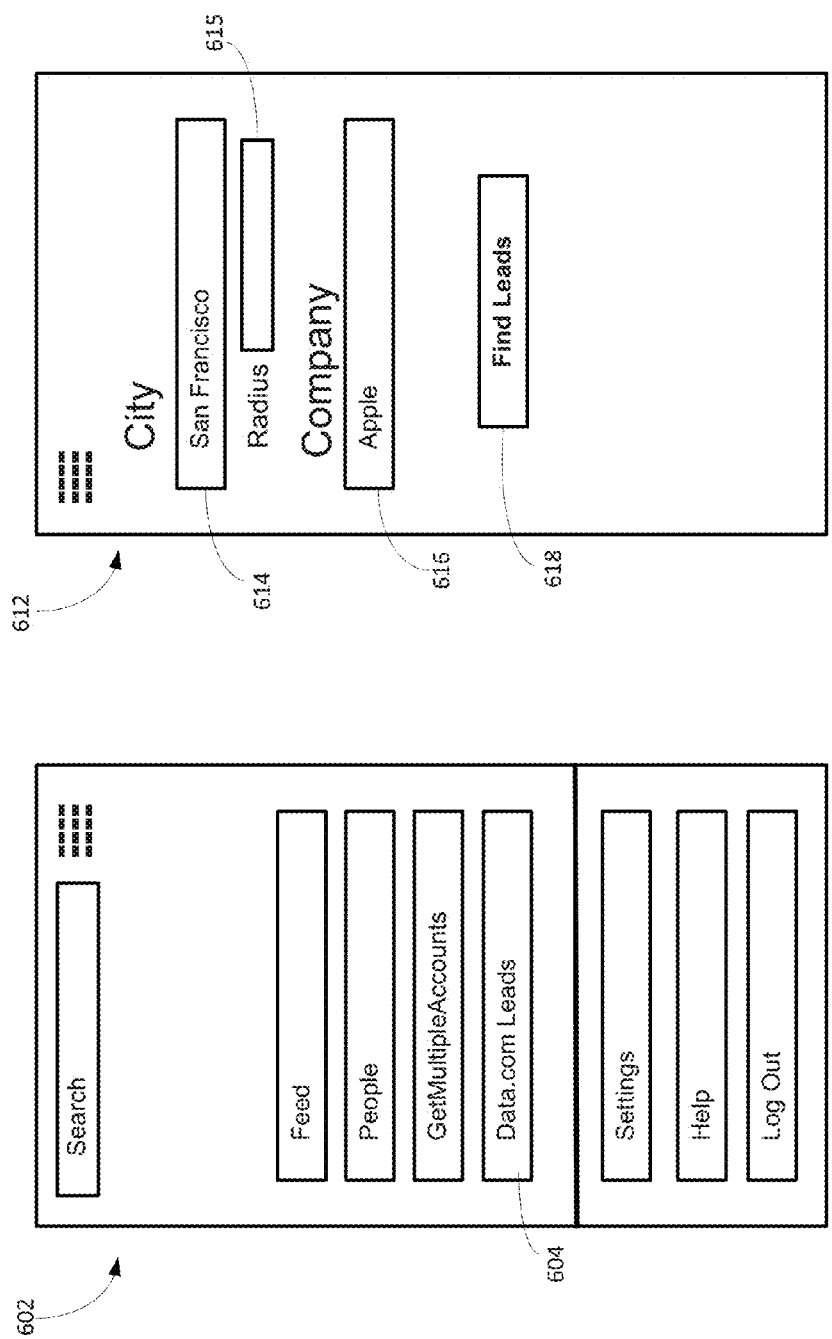

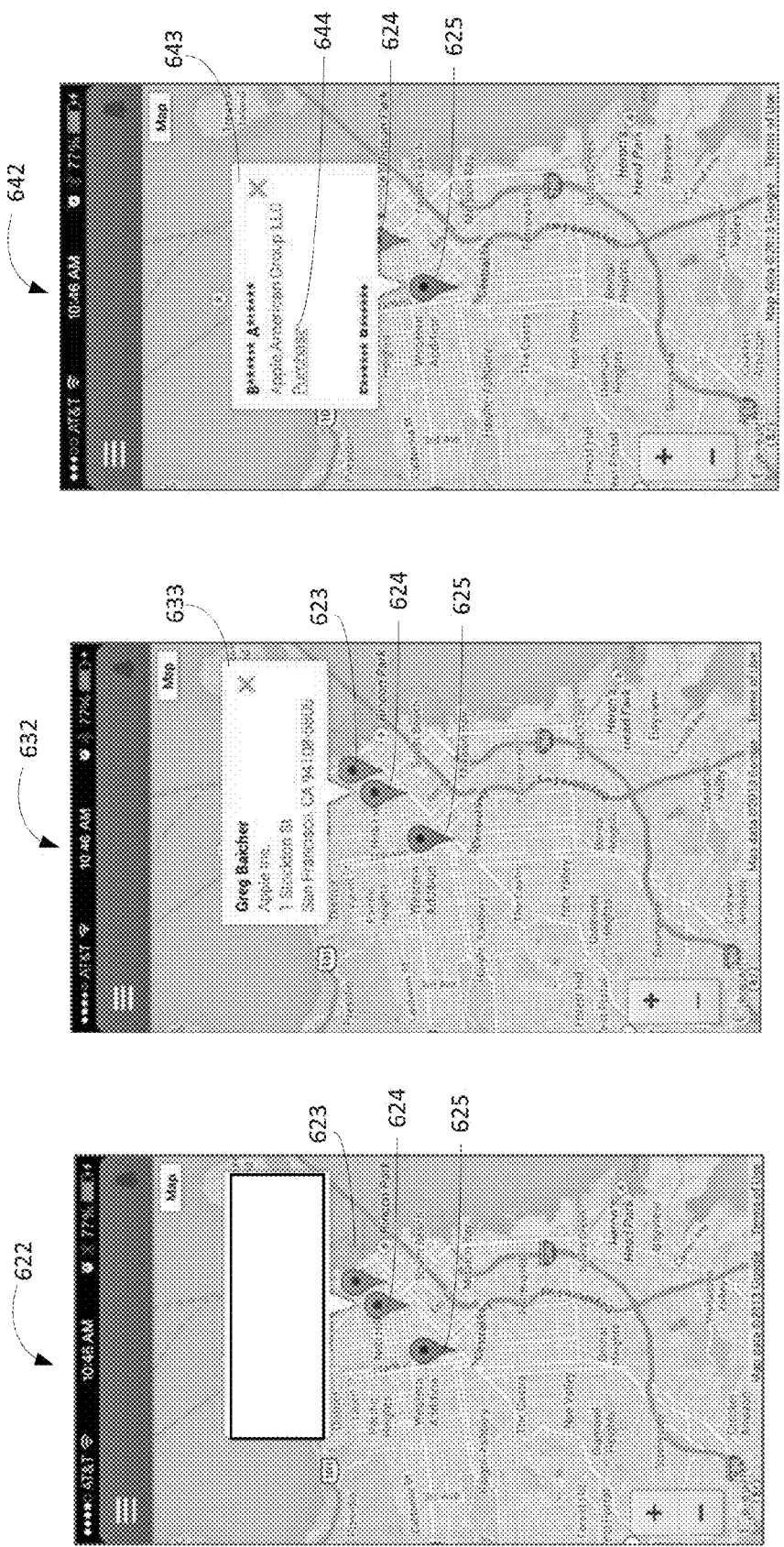

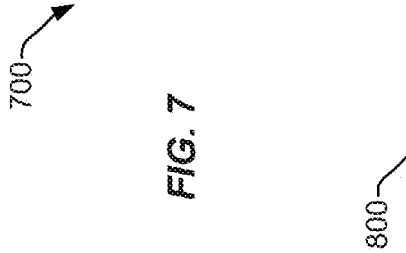

700 ↘

701 —— SELECT ContactId, LastName, FirstName, Title, State, City, CompanyName
702 —— FROM DatacloudContact
703 —— WHERE CompanyName LIKE 'Cisco' and State = 'CA'
704 —— ORDER BY LastName
705 —— LIMIT 15

| | ContactId | LastName | FirstName | Title | State | City | CompanyName |
|---|---|---|---|---|---|---|---|
| 801 | 13962651 | C******* | J******* | ******* | CA | San Jose | Cisco Systems, Inc. |
| 802 | 387224678 | Cooper | David | Product Sales Specialist | CA | | |
| 803 | 19266707 | C******* | D******* | ******* | CA | San Jose | Cisco Systems, Inc. |
| 804 | 35023206 | C******* | G******* | ******* | CA | San Jose | Cisco Systems, Inc. |
| 805 | 7934165 | C******* | G******* | ******* | CA | San Jose | Cisco Systems, Inc. |
| 806 | 9547395 | C******* | M******* | ******* | CA | San Jose | Cisco Systems, Inc. |
| 807 | 8129174 | C******* | S******* | ******* | CA | San Jose | Cisco Systems, Inc. |
| 808 | 6897227 | C******* | T******* | ******* | CA | San Jose | Cisco Systems, Inc. |
| 809 | 36158568 | C******* | J******* | ******* | CA | San Jose | Cisco Systems, Inc. |
| 810 | 19263430 | C******* | M******* | ******* | CA | San Jose | Cisco Systems, Inc. |
| 811 | 9278391 | C******* | R******* | ******* | CA | San Jose | Cisco Systems, Inc. |
| 812 | 16335152 | C******* | A******* | ******* | CA | San Jose | Cisco Systems, Inc. |
| 813 | 46303838 | C******* | T******* | ******* | CA | San Jose | Cisco Systems, Inc. |
| 814 | 22203066 | C******* | V******* | ******* | CA | San Jose | Cisco Systems, Inc. |
| 815 | 34429799 | C******* | S******* | ******* | CA | San Jose | Cisco Systems, Inc. |

FIG. 8

PURCHASING CONTACT INFORMATION FROM AN ELECTRONICALLY DISPLAYED MAP

TECHNICAL FIELD

This disclosure relates generally to database management, and more particularly, to systems and methods for purchasing a record from a map display and adding the record to a user's database account.

COPYRIGHT NOTICE

Portions of this disclosure contain material which is subject to copyright protection. The copyright owner has no objection to the facsimile reproduction by anyone of the patent disclosure, as it appears in the records of the United States Patent and Trademark Office, but otherwise reserves all rights.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents one or more different approaches to database management issues, which may be unique.

A multi-tenant database system ("MTS") typically includes various hardware and software components and is shared by one or more customers as a "cloud computing" solution for data storage and management. Service providers offer access to such systems through a network, such as the Internet. For example, an application server may be configured to simultaneously process multiple requests for many different customers, and a database may be configured to store data that is shared by many different customers.

The growing popularity of cloud computing and software as a service ("SaaS") has led to the development of software platforms for businesses and other enterprises that provide more advanced cloud-based products and services, in addition to simple data storage and management requirements. Salesforce.com inc., of San Francisco, Calif., offers a number of customer relationship management ("CRM") products and services that are cloud-based solutions upon which relevant applications can be launched and/or built for any business or enterprise. For example, the Salesforce1 platform is a cloud-based platform for the development and deployment of mobile enterprise applications.

An application ("app") is a collection of components such as tabs, reports, dashboards, and other pages that address a specific organizational need. For example, the Salesforce1 platform supports mobile application development, and is built on a foundation called Force.com, which is a set of tools and services for creating and launching employee-facing applications that are both mobile and social. The Force.com platform includes a number of standard applications, which may be extended by customization, or custom applications may be created. The Force.com platform also includes access to a store for applications called the AppExchange, which is similar to the iTunes App Store, but for business applications.

One of the popular features of the Salesforce CRM software is sales lead management and tracking. With Salesforce CRM software, critical information regarding leads and opportunities can be shared in real time with colleagues. Further, using the data repository services of Data.com, searches for new leads can be conducted.

However, while searching for and following up on new leads is easy enough when the user/salesperson is in the office, it can be more difficult when the user/salesperson is on the road visiting accounts, leads and prospects. Often, such a person would like to visit new prospects, but real time tools for finding new leads are not readily available for mobile applications. Thus, it would thus be desirable to have a mobile application that supports real time lead support, including identifying and locating contacts that are near the user's present location. In addition, a means should be provided for purchasing a contact if the contact information is not accessible to the user.

BRIEF DESCRIPTION OF THE DRAWINGS

In the following drawings, like reference numbers are used to refer to like elements. Although the following figures depict various examples, the one or more implementations are not limited to the examples depicted in the figures.

FIG. 3 is a block diagram illustrating a schema for a contact record and several records created according to the schema.

FIG. 4 is an example of a data table storing the records shown in FIG. 3.

FIGS. 6A-6E are illustrative user interfaces implementing various steps of the process illustrated in FIG. 5;

FIG. 7 is one example of an object query language syntax for conducting a search;

FIG. 8 is one example of a data structure for storing the results of the search illustrated in FIG. 7;

DETAILED DESCRIPTION

1. Overview

This disclosure describes systems and methods that enable a user to search for nearby contacts and to display the contacts on a map display. Further, the user is provided with a means to purchase displayed contacts.

2. Hardware/Software Environment

In general, the methods described herein may be implemented as software routines forming part of a database system for the storage and management of data records. As used herein, the term multi-tenant database system ("MTS") refers to those systems in which various elements of hardware and software of the database system may be shared by one or more customers. For example, an application server may simultaneously process requests for a large number of customers, and a database table may store rows of data for a potentially much larger number of customers. As used herein, the term query refers to a set of steps used to access information in a database system.

Figure 1:
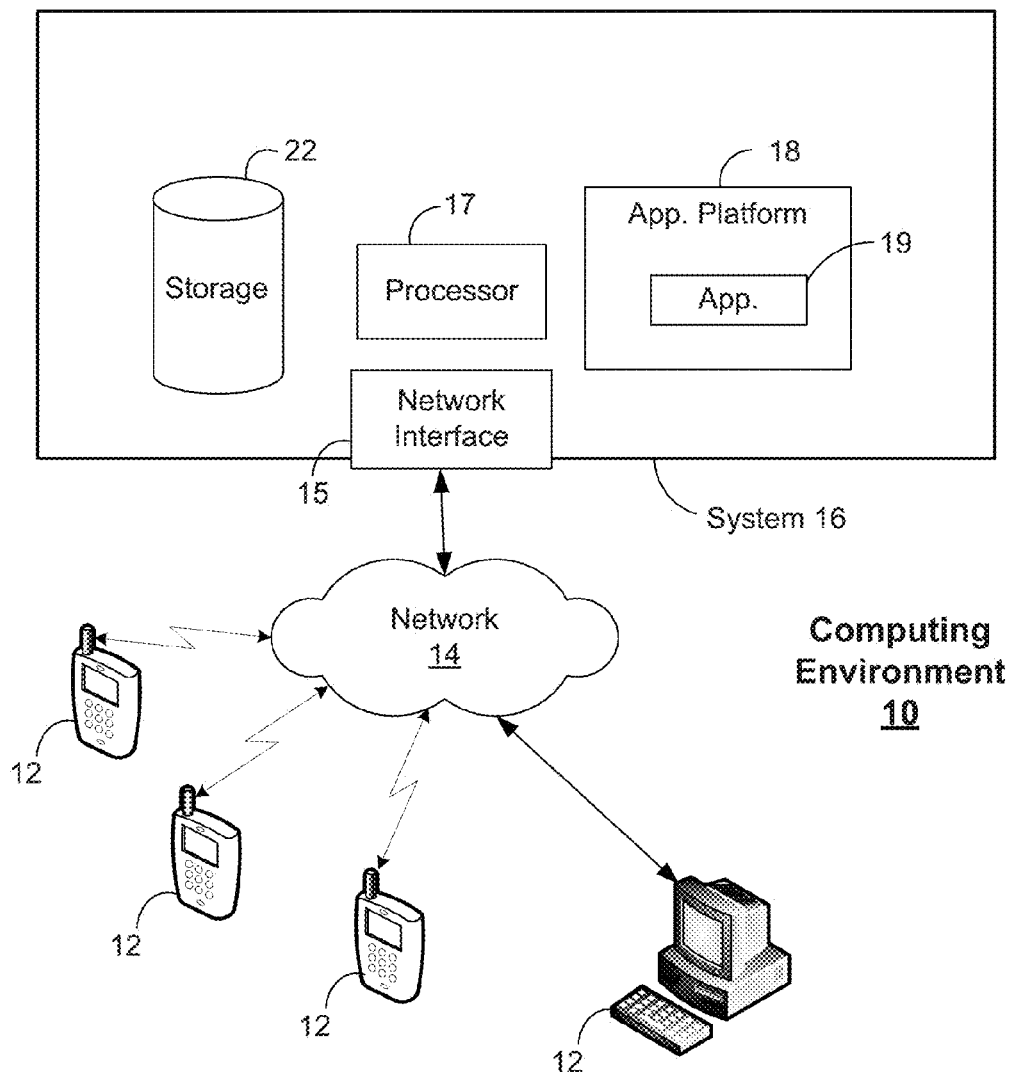
FIG. 1 is a simplified block diagram illustrating one embodiment of an on-demand multi-tenant database system.
Figure 2A:
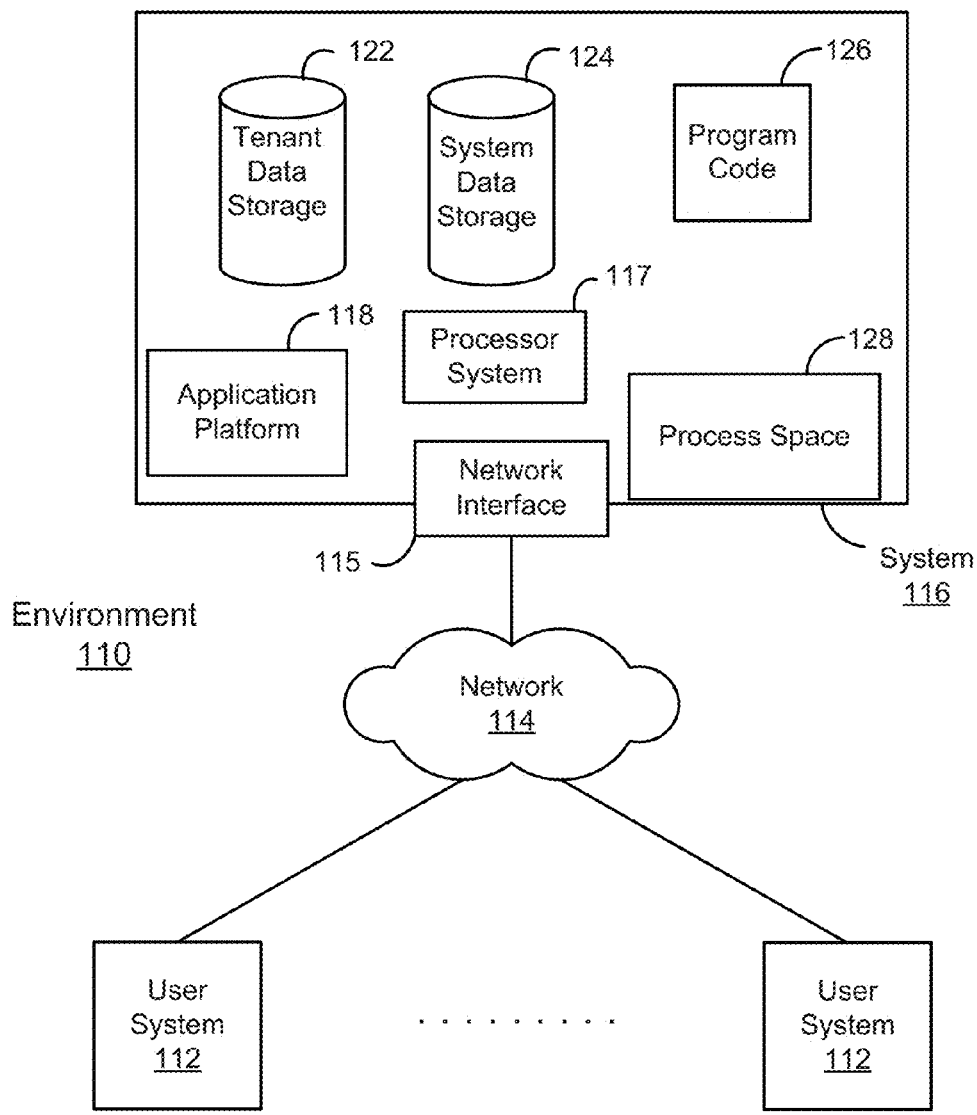
FIG. 2A illustrates a block diagram of an example environment for an on-demand multi-tenant database service.
Figure 2B:
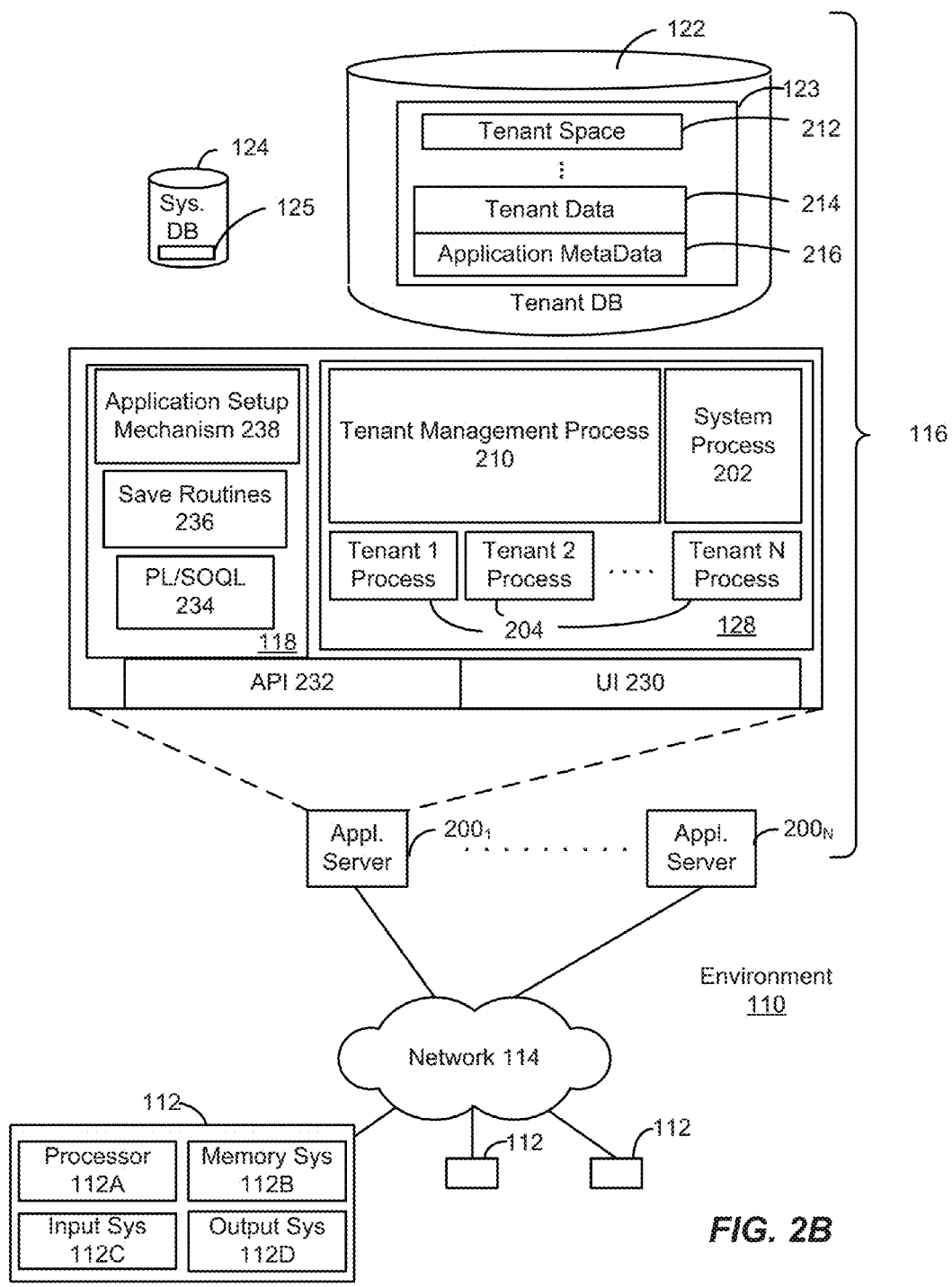
FIG. 2B illustrates a block diagram of an embodiment of elements of FIG. 2A and various possible interconnections between those elements.

FIG. 1 is a simplified block diagram illustrating an embodiment of an on-demand multi-tenant database system 16 operating in a computing environment 10. User devices or systems 12 access and communicate with the database system 16 through network 14 in a known manner. More detailed embodiments of an on-demand multi-tenant database system 116 are shown in FIGS. 2A and 2B, described at the end of this Detailed Description.

User devices 12 may be any type of fixed or mobile processor-based computing device, such as a desktop computer, laptop computer, tablet, smartphone, etc. Network 14 may be any type of processor-based computing network, such as the Internet, local area network ("LAN"), wide area network ("WAN"), etc.

The operation of the database system 16 is controlled through central processor system 17, and a network interface 15 manages inbound and outbound communications between the database system 16 and the network 14. One or more applications 19 are managed and operated by the database system 16 through application platform 18. For example, a database management application runs on application platform 18 and provides program instructions executed by the processor 17 for indexing, accessing, updating and storing information in the database. In addition, particular methods are described herein which may be incorporated into one or more components of the database management application, preferably as software routines, for a user to search for and purchase records stored in the database and to add the purchased records to the user's database account.

The database system 16 provides user systems 12 with managed access to many database features and applications. For example, the database system 16 provides access to tenant data storage 22, which is configured through the database system to maintain data for multiple users/tenants. Tenant data storage 22 may be physically incorporated within the database system 16, or configured as remote storage (not shown), likewise accessible and useful to the database system to support user systems 12. The database system 16 is designed to facilitate storage and organized access for many different types of tenant data.

3. Database Records

A database is a collection of objects, such as a set of logical tables, containing data that is organized into defined categories. The objects are typically accessible through an application programming interface ("API"), which is provided by a software application, such as a CRM software product, such as those offered by salesforce.com, inc. of San Francisco, Calif. In particular, salesforce.com markets Data.com as a cloud-based database primarily for storing and providing access to contacts and company information through three data objects: DatacloudContact, DatacloudCompany, and DatacloudDandBCompany.

A table is one representation of a data object, and is used herein to simplify the conceptual description of objects, but should not be considered limiting. The terms "table" and "object" may be used interchangeably herein. Each table generally contains one or more data categories logically arranged as columns or fields or properties according to a defined schema. Each row of the table is a record containing an instance of data for each category defined by the fields.

In a typical example, a multi-tenant database such as database system 16 stores and provides access to large numbers of records containing information from many organizations. However, access to records is typically limited in some logical manner, for example, by subscription. For example, a business or enterprise may purchase a subscription from a service provider to access some or all of the database records in accord with the needs of the company. Further, access within the business or enterprise may be further limited by security or authorization procedures.

Each type of record may be defined to include multiple fields or properties. For example, FIG. 3 shows a representation for a typical schema 300 for a particular type of database record called a "contact" that contains contact information for an individual. The contact record 300 can be defined to include a number of predefined fields or properties related to an individual personal or business contact, including a field 310 labeled "FirstName" for storing a first name; a field 311 labeled "LastName" for storing a last name; a field 312 "Title" for storing a job title; a field 313 "CompanyName" for storing a company name; a field 314 "CompanyAddress" for storing a company address; a field 315 "Telephone" for storing a telephone number; a field 316 "Email" for storing an email address, and so forth. The fields shown and described are merely illustrative since a database record and its schema could be constructed in many ways for many different applications with different numbers of fields or properties. Individual data records R1, R2 and R3, for example, are created according to the schema 300 and each record represents a business card or contact for a single individual having values for the predefined fields, some of which are shown in FIG. 3.

FIG. 4 illustrates one embodiment of a table 400, where records R1, R2, R3 are stored as separate rows in the table organized in accord with schema 300, each row being a collection of values for a single record, and each column being a field or data category applicable to all rows in the table. For example, row R1 includes the data values "John", "Doe", "Vice-President, Sales", and "Oracle"; row R2 includes the data values "George", "Smith", "Vice-President, Engineering", and "Intel"; and row R3 includes the data values "Jack", "Daniel", "Vice-President, Legal", and "ABC".

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is incorporated herein by reference, and teaches systems and methods for creating custom objects as well as customizing standard objects in a multi-tenant database system. In certain embodiments, all custom entity data rows are stored in a single multi-tenant physical table, which may contain multiple logical tables per organization. It is transparent to customers that their multiple "tables" are in fact stored in one large table or that their data may be stored in the same table as the data of other customers.

Database access is typically secure such that users may only access objects for which they have authorization, as determined by the organization configuration, user permissions and access settings, data sharing model, and/or other factors related specifically to the system and its objects. For example, users of the database can subscribe to one or more objects on the database in order to access, create and update records stored in the objects.

4. Method for Purchasing Database Records

Figure 5:
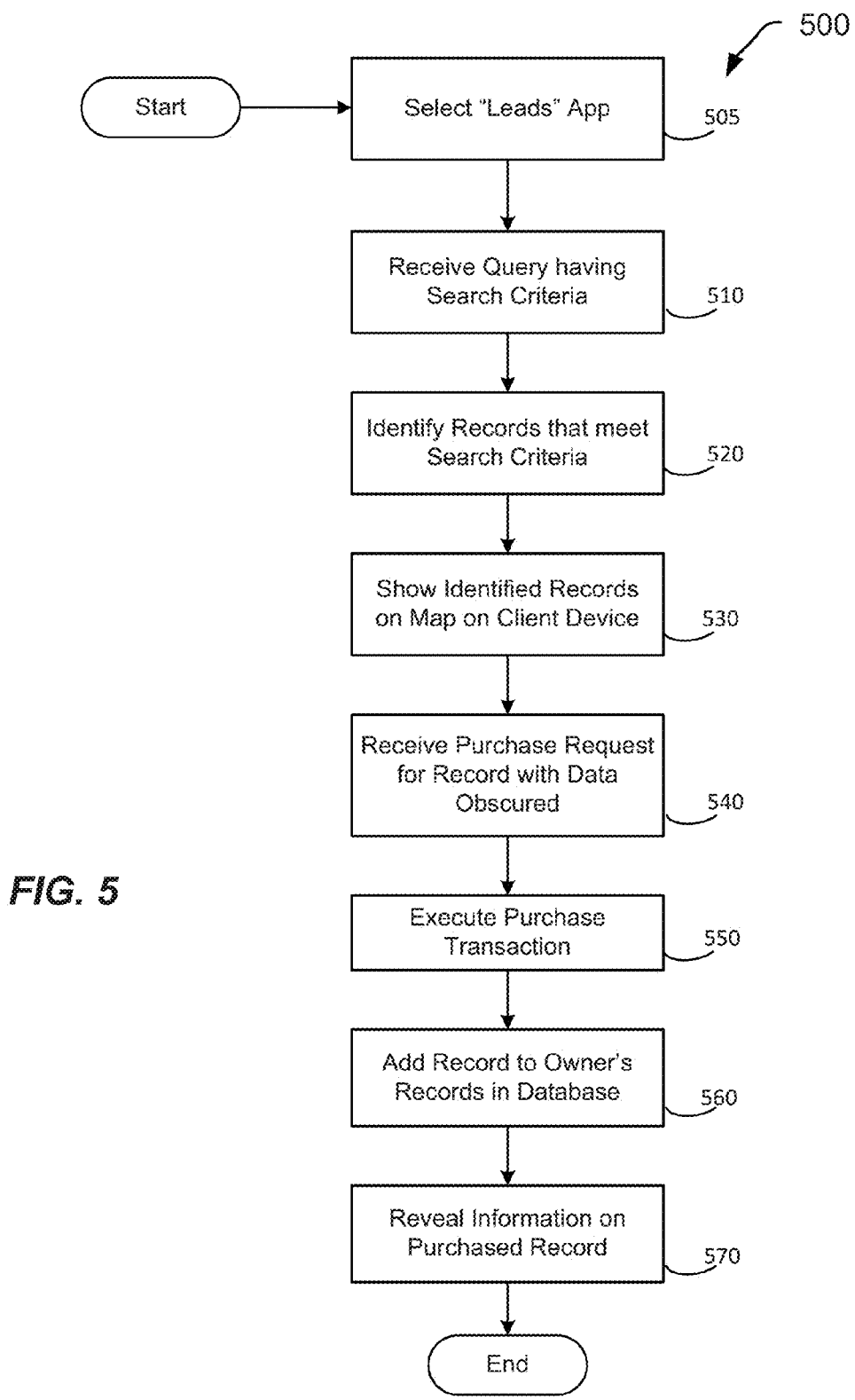
FIG. 5 is a flow chart illustrating one embodiment of a process for purchasing a database record.

FIG. 5 illustrates a simple process 500 that allows a user to search for and purchase contact records for nearby contacts, while FIGS. 6A-6E illustrate an implementation of the process on a mobile electronic device, such as a smartphone, using the Salesforce1 platform.

In step 505, a user selects an application for managing leads. For example, in FIG. 6A, a user interface ("UI") 602 for a mobile device operating in a Salesforce1 network platform is illustrated. UI 602 displays a number of buttons or widgets that are used to select applications or features, including Feed, People, GetMultipleAccounts, and Data-.com Leads. Standard features like Settings, Help, and Log Out are also provided. In this example, the user selects widget 604 labeled "Data.com Leads" by tapping the display in order to search for new sales leads.

In step 510, the database receives a query from a user. The query includes criteria for selecting records from the database, such as a city and a company name. For example, after selecting the Data.com Leads application 604 in FIG. 6A, a new UI 612 is presented to the user as illustrated in FIG. 6B. The UI 612 includes field 614 for entering a location and field 616 for entering a company name. The location field 614 may be configured on the settings page, for example, to automatically use the current location of the user, which may be obtained from geolocation software running on the user's smartphone. Alternatively, the location may be manually entered by the user, or a number of locations may be listed in a pull-down menu.

In this example, the location entered into field 614 is San Francisco, and the company name entered into field 616 is "Apple." When the fields 614 and 616 are filled, the user clicks or taps button 618 labeled "Find Leads" to initiate processing of the query.

In some embodiments, the location criteria may include a distance or radius from the specified location, which could also be set in optional field 615. The distance from the specified location may be set as a default value, such as 5 miles, or may be selected from a pull-down list, or entered manually by the user.

In step 520, after receiving selection of the Find Leads button, the database processes the query and identifies results as one or more records stored in the database that satisfy the search criteria. In step 530, the database sends instructions, e.g., browser code such as Javascript, to the client device for showing the results of the search on a map rendered on the client device.

For example, FIGS. 6C-6E illustrate how the search results could be shown on a map of downtown San Francisco, rendered as UI 622 on FIG. 6C; as UI 632 on FIG. 6D; and as UI 642 on FIG. 6E. In this example, three records are identified that satisfy the search criteria, and these records are indicated by a virtual representation on the map, such as drop pin icons 623, 624, and 625.

In an embodiment, each of the icons 623, 624, and 625 has a visual attribute that indicates whether or not the corresponding contact is owned by or associated with the user. For example, icons 623 and 624 have a first type of cross-hatching for indicating that the corresponding contact is owned by or associated with the user, and icon 625 has a second type of cross-hatching for indicating that the corresponding contact is not owned by or associated with the user. In an alternative implementation, the icons could be distinguished on the map by color, e.g., a green icon represents a contact already owned by or associated with the user, while a red icon represents a contact not owned by or associated with the user.

Selecting or hovering over an icon on the map will reveal the contact information if the corresponding record is owned by or associated with the user, but at least some of the contact information will be obscured if the record is not owned by or associated with the user. For example, in FIG. 6D, after tapping icon 624, text box 633 appears above the icon with the contact information for that record listed inside the box. However, in FIG. 6E, after tapping icon 625, text box 643 appears above the icon with the name obscured. In one embodiment, the values of selected fields are hidden or obscured until the record is purchased. For example, the following fields are typically hidden for records that are not owned by or associated with the user: Email; FirstName; LastName; Phone; Street; Title.

A selectable widget 644 labeled "Purchase" is displayed as part of text box 643, and is configured as a hyperlink to initiate an electronic transaction to purchase the record when the widget is selected by the user. Thus, in step 540, the database receives the selection of the purchase widget, which evidences a request from the user to purchase a record that has obscured information. In step 550, the purchase transaction is executed. For example, the user account may have a credit card associated with it in order to pay for the user's purchases, or the user may have credits associated with his account, which may also be used to satisfy a purchase transaction.

In step 560, the purchased record is added to the user's account in the database, and in step 570, the information for the purchased record is revealed when the record is shown or selected on the map displayed on the user's device, as in FIG. 6D.

A. Searching Database Records

The contact information and company information stored in database 16 can be searched for any number of reasons, for example, to locate sales leads. In one embodiment, e.g., Data.com, a number of open APIs are provided to facilitate application development specific to the needs of an enterprise. (See, e.g., Ver. 31.0, Data.com API Developer's Guide, Summer 2014, incorporated by reference herein). Access to the APIs should be subject to an authorization procedure, such as the OAuth open standard for authentication.

A "Search API" is provided to access objects stored in the database for the purpose of finding contact and company records, and purchasing records, using an object query language, e.g., Salesforce Object Query Language (SOQL). The company records in the Data.com database are similar to "account" records in the Salesforce.com database.

A user can construct a simple query 700 of the Search API using SOQL as shown in FIG. 7 by specifying a list of fields to retrieve in step 701 ("SELECT ContactId, LastName, FirstName, Title, State, City, CompanyName"); the source object in step 702 ("FROM DatacloudContact"); conditions or criteria for selecting rows in the source object in step 703 ("WHERE CompanyName LIKE 'Cisco' and State='CA'"); and how to present the results in step 704 ("ORDER LastName"). Step 705 indicates a limit to the number of records retrieved by the search.

The results of query 700 are shown in table 800 in FIG. 8. The only contact in this list that is completely visible is shown in row 802, which indicates that the contact "David Cooper" stored in row 802 is already owned by or associated with the user's account in the database. All other rows of table 800, i.e., rows 801 and 803-815, have the last name and first name obscured except for the first letter, and the title is obscured.

Although these results are shown in table 800, they could also be rendered onto a map as described herein.

A search for companies instead of contacts may be similarly constructed using an SOQL request with the Search API.

The "Match API" is provided to compare the contacts and companies already purchased by the user/enterprise with the most current data in the Data.com database, for example, using REST (REpresentational State Transfer) queries. The Match API finds matching records and indicates how they differ.

B. Purchasing Records

The Search API can also be use to configure a purchase transaction for enabling users to acquire records. Once a user purchases a record from the database, the user obtains access to all the information associated with that record.

Figure 9:
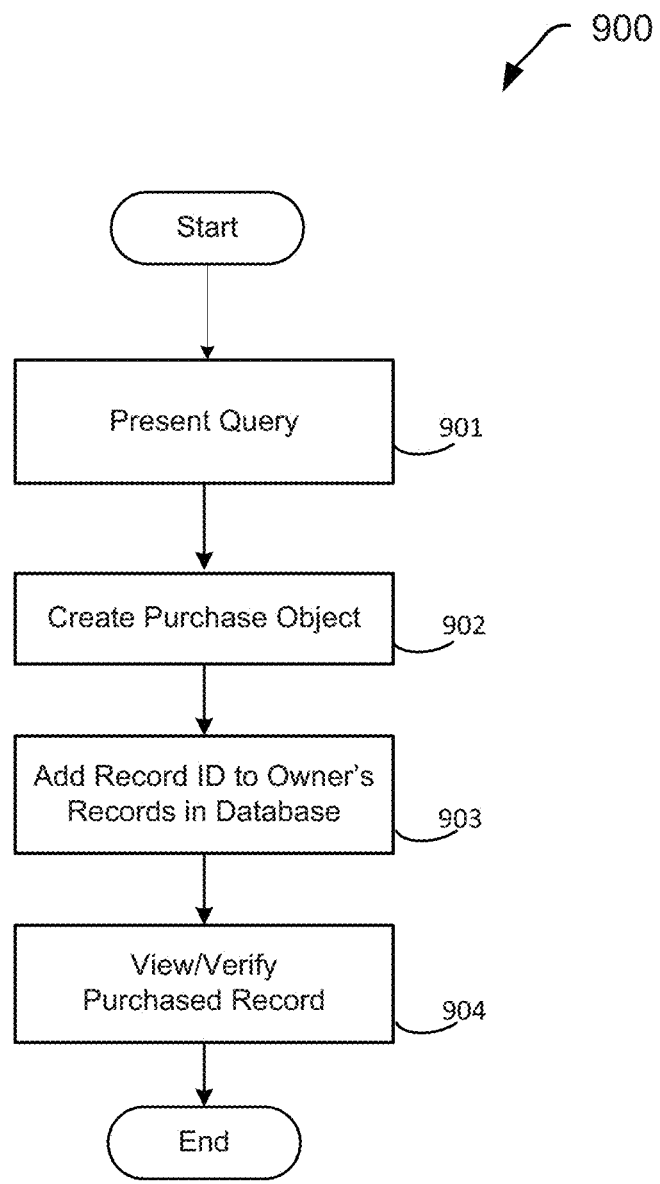
FIG. 9 is a flow chart illustrating one embodiment of a process for purchasing a database record.

A basic process flow 900 for purchasing a record is illustrated in FIG. 9. In step 901, an SOQL query is presented in the Data.com Search API to locate contact or company records meeting user defined criteria. In the Data. com platform, the user can search the DatacloudContact object for contacts, or search the DatacloudCompany object (or the DatacloudDandBCompany object) for companies.

In step 902, in response to the query, a purchase object (DatacloudPurchaseUsage object) is created by making a POST request to a specified URL, e.g.:

/services/data/v30.0/sobjects/DatacloudPurchaseUsage.

In step 903, the purchase object is updated by inserting the identification for the contact (ContactID) or the company (CompanyID) into the user's account. This is done by again making a POST request to a specified URL, e.g.:

/service s/data/v30.0/sobjects/DatacloudOwnedEntity

Finally, in step 904, the Search API is used to view the purchased records to verify that all the previously hidden fields are now visible.

C. Mapping Search Results

It is now common to incorporate a mapping feature into web applications, for example, by using a Map API, such as provided by Mapquest, Google Maps, and others. Further, the methods for incorporating a mapping feature are generally well known, and will not be described in detail. See, for example, the JavaScript Maps API v7.0 Developer's Guide, available online at http://developer.mapquest.com/web/documentation/sdk/javascript/v7.0, or Google Maps API documentation, available online at https://developers.google.com/maps/support/.

Figure 10:
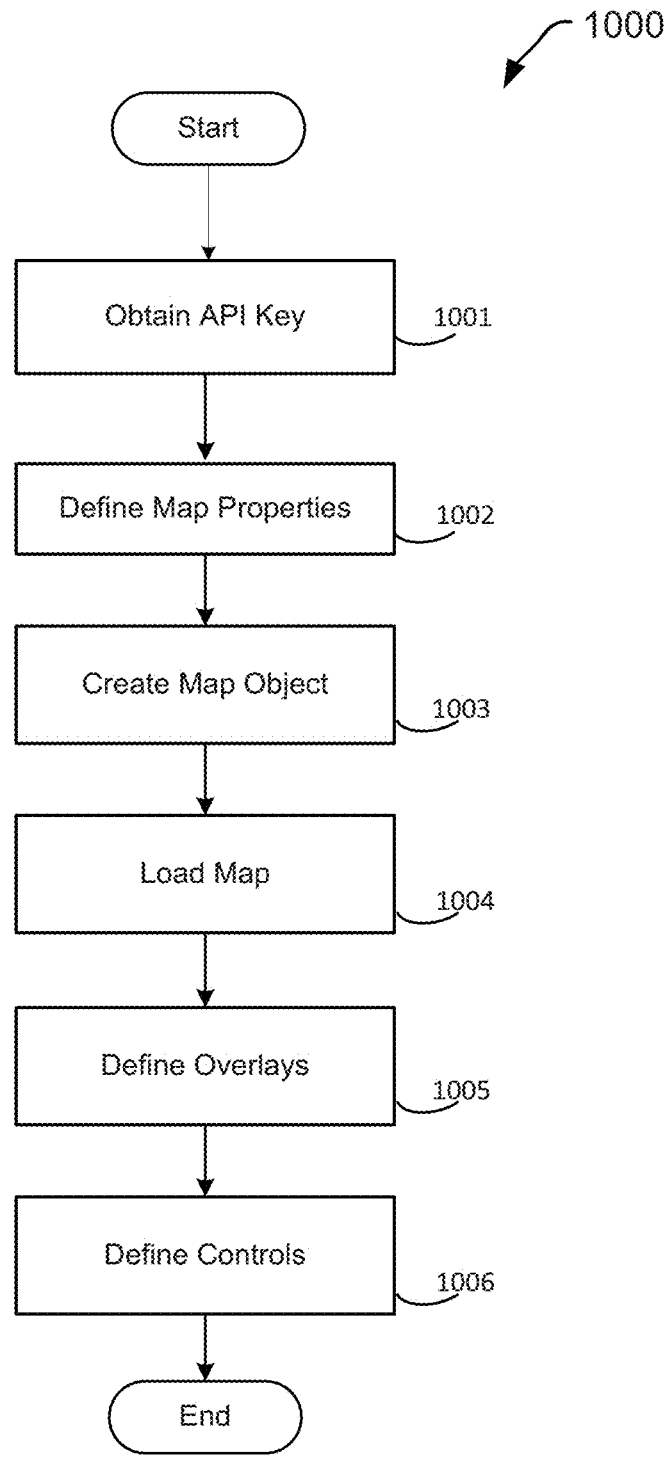
FIG. 10 is a flow chart illustrating one embodiment of a process for mapping a database record.

A process 1000 for mapping a record is illustrated in FIG. 10. An application developer incorporating a mapping feature should understand the basics of the JavaScript language, the limitations of document/style types, and browser compatibility modes.

In step 1001, the developer requests and obtains an API key from the map provider in order to use the Map API. In step 1002, map properties are defined using JavaScript statements. Extensive documentation and support materials are available on provider web sites for their Map API, including examples and templates for JavaScript statements for different application scenarios. In step 1003, a map object is created and stored. In step 1004, the map is loaded into a specified application, such as the Leads application in the Salesforce1 mobile platform.

In step 1005, overlays are defined for the map, such as markers or icons, polylines, polygons, information windows, etc. For example, this step is used to define the icons placed on the map in correspondence with an identified contact, and to define the information windows that pop up when an icon is selected (or hovered over).

In step 1006, controls for the map are defined by accepting or modifying standard controls, and/or creating custom controls. At this point, the mapping feature is fully functional through the Map API and can be called by the Search API to map the results of a query.

5. Detailed Database Embodiments

FIG. 2A is a block diagram of an exemplary environment 110 for use of an on-demand database service. Environment 110 may include user systems 112, network 114 and system 116. Further, the system 116 can include processor system 117, application platform 118, network interface 120, tenant data storage 122, system data storage 124, program code 126 and process space 128. In other embodiments, environment 110 may not have all of the components listed and/or may have other elements instead of, or in addition to, those listed above.

User system 112 may be any machine or system used to access a database user system. For example, any of the user systems 112 could be a handheld computing device, a mobile phone, a laptop computer, a tablet, a work station, and/or a network of computing devices. As illustrated in FIG. 2A (and in more detail in FIG. 2B), user systems 112 interact via a network 114 with an on-demand database service, which in this embodiment is system 116.

An on-demand database service, such as system 116, is a database system that is made available to outside users that are not necessarily concerned with building and/or maintaining the database system, but instead, only that the database system be available for their use when needed (e.g., on the demand of the users). Some on-demand database services store information from one or more tenants into tables of a common database image to form a multi-tenant database system (MTS). Accordingly, the terms "on-demand database service 116" and "system 116" will be used interchangeably in this disclosure. A database image may include one or more database objects or entities. A database management system (DBMS) or the equivalent may execute storage and retrieval of information against the database objects or entities, whether the database is relational or graph-oriented. Application platform 118 is a framework that allows the applications of system 116 to run, such as the hardware and/or software, e.g., the operating system. In an embodiment, on-demand database service 116 may include an application platform 118 that enables creation, managing and executing one or more applications developed by the provider of the on-demand database service, users accessing the on-demand database service via user systems 112, or third party application developers accessing the on-demand database service via user systems 112.

The users of user systems 112 may differ in their respective capacities, and the capacity of a particular user system 112 might be entirely determined by permission levels for the current user. For example, where a salesperson is using a particular user system 112 to interact with system 116, that user system has the capacities and permissions allotted to that salesperson. However, while an administrator is using that user system to interact with system 116, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 114 is any network or combination of networks of devices that communicate with one another. For example, network 114 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global network of networks often referred to as the Internet, that network will be used in many of the examples herein. However, it should be understood that the networks used with the one or more implementations are not so limited, although TCP/IP is a frequently implemented protocol.

User systems 112 communicate with system 116 using TCP/IP and, at a higher network level, use other common Internet protocols to communicate, such as HTTP, FTP, AFS, WAP, etc. In an example where HTTP is used, user system 112 might include an HTTP client commonly referred to as a browser for sending and receiving HTTP messages to and from an HTTP server at system 116. Such an HTTP server might be implemented as the sole network interface between system 116 and network 114, but other techniques might be used as well or instead. In some implementations, the interface between system 116 and network 114 includes load sharing functionality, such as round-robin HTTP request distributors to balance loads and distribute incoming HTTP requests evenly over a plurality of servers. At least as for the users that are accessing that server, each of the plurality of servers has access to the data stored in the MTS; however, other alternative configurations may be used instead.

In one embodiment, system 116 implements a web-based customer relationship management (CRM) system. For example, in one embodiment, system 116 includes application servers configured to implement and execute CRM software applications as well as provide related data, code, forms, web pages and other information to and from user systems 112 and to store to, and retrieve from, a database system related data, objects, and Web page content. With a multi-tenant system, data for multiple tenants may be stored in the same physical database object; however, tenant data typically is arranged so that data of one tenant is kept logically separate from that of other tenants so that one tenant does not have access to another tenant's data, unless such data is expressly shared. In certain embodiments, system 116 implements applications other than, or in addition to, a CRM application. For example, system 116 may provide tenant access to multiple hosted (standard and custom) applications, including a CRM application. User (or third party developer) applications, which may or may not include CRM, may be supported by the application platform 118, which manages creation, storage of the applications into one or more database objects and executing of the applications in a virtual machine in the process space of the system 116.

One arrangement for elements of system 116 is shown in FIG. 2A, including a network interface 120, application platform 118, tenant data storage 122 for tenant data 123, system data storage 124 for system data 125 accessible to system 116 and possibly multiple tenants, program code 126 for implementing various functions of system 116, and a process space 128 for executing MTS system processes and tenant-specific processes, such as running applications as part of an application hosting service. Additional processes that may execute on system 116 include database indexing processes.

Several elements in the system shown in FIG. 2A include conventional, well-known elements that are explained only briefly here. For example, each user system 112 could include a desktop personal computer, workstation, laptop, PDA, cell phone, or any wireless access protocol (WAP) enabled device or any other computing device capable of interfacing directly or indirectly to the Internet or other network connection. User system 112 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 112 to access, process and view information, pages and applications available to it from system 116 over network 114. Each user system 112 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 116 or other systems or servers. For example, the user interface device can be used to access data and applications hosted by system 116, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 112 and all of its components are operator configurable using applications, such as a browser, including computer code run using a central processing unit such as an Intel Pentium® processor or the like. Similarly, system 116 (and additional instances of an MTS, where more than one is present) and all of their components might be operator configurable using application(s) including computer code to run using a central processing unit such as processor system 117, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 116 to intercommunicate and to process web pages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 116 is configured to provide web pages, forms, applications, data and media content to user (client) systems 112 to support the access by user systems 112 as tenants of system 116. As such, system 116 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 2B also illustrates environment 110. However, in FIG. 2B elements of system 116 and various interconnections in an embodiment are further illustrated. FIG. 2B shows that user system 112 may include processor system 1110, memory system 1111, input system 112C, and output system 112D. FIG. 2B shows network 114 and system 116. FIG. 2B also shows that system 116 may include tenant data storage 122, tenant data 123, system data storage 124, system data 125, User Interface (UI) 230, Application Program Interface (API) 232, PL/SOQL 234, save routines 236, application setup mechanism 238, applications servers $200_1$-$200_N$, system process space 202, tenant process spaces 204, tenant management process space 210, tenant storage area 212, user storage 214, and application metadata 216. In other embodiments, environment 110 may not have the same elements as those listed above and/or may have other elements instead of, or in addition to, those listed above.

User system 112, network 114, system 116, tenant data storage 122, and system data storage 124 were discussed above in FIG. 2A. Regarding user system 112, processor system 1110 may be any combination of one or more processors. Memory system 1111 may be any combination of one or more memory devices, short term, and/or long term memory. Input system 112C may be any combination of input devices, such as one or more keyboards, mice, trackballs, scanners, cameras, and/or interfaces to networks. Output system 112D may be any combination of output devices, such as one or more monitors, printers, and/or interfaces to networks.

As shown by FIG. 2B, system 116 may include a network interface 115 (of FIG. 2A) implemented as a set of HTTP application servers 200, an application platform 118, tenant data storage 122, and system data storage 124. Also shown is system process space 202, including individual tenant process spaces 204 and a tenant management process space 210. Each application server 200 may be configured to tenant data storage 122 and the tenant data 123 therein, and system data storage 124 and the system data 125 therein to serve requests of user systems 112. The tenant data 123 might be divided into individual tenant storage areas 212, which can be either a physical arrangement and/or a logical arrangement of data. Within each tenant storage area 212, user storage 214 and application metadata 216 might be similarly allocated for each user. For example, a copy of a user's most recently used (MRU) items might be stored to user storage 214. Similarly, a copy of MRU items for an entire organization that is a tenant might be stored to tenant storage area 212. A UI 230 provides a user interface and an API 232 provides an application programmer interface to system 116 resident processes to users and/or developers at user systems 112. The tenant data and the system data may be stored in various databases, such as one or more Oracle™ databases, or in distributed memory as described herein.

Application platform 118 includes an application setup mechanism 238 that supports application developers' creation and management of applications, which may be saved as metadata into tenant data storage 122 by save routines 236 for execution by subscribers as one or more tenant process spaces 204 managed by tenant management process 210 for example. Invocations to such applications may be coded using PL/SOQL 234 that provides a programming language style interface extension to API 232. A detailed description of some PL/SOQL language embodiments is discussed in U.S. Pat. No. 8,271,341, entitled Method And System For Governing Resource Consumption in a Multi-Tenant System, which is incorporated by reference herein. Invocations to applications may be detected by one or more system processes, which manages retrieving application metadata 216 for the subscriber making the invocation and executing the metadata as an application in a virtual machine.

Each application server 200 may be coupled for communications with database systems, e.g., having access to system data 125 and tenant data 123, via a different network connection. For example, one application server $200_1$ might be coupled via the network 114 (e.g., the Internet), another application server $200_{N-1}$ might be coupled via a direct network link, and another application server $200_N$ might be coupled by yet a different network connection. Transfer Control Protocol and Internet Protocol (TCP/IP) are typical protocols for communicating between application servers 200 and the database system. However, it will be apparent to one skilled in the art that other transport protocols may be used to optimize the system depending on the network interconnect used.

In certain embodiments, each application server 200 is configured to handle requests for any user associated with any organization that is a tenant. Because it is desirable to be able to add and remove application servers from the server pool at any time for any reason, there is preferably no server affinity for a user and/or organization to a specific application server 200. In one embodiment, an interface system implementing a load balancing function (e.g., an F5 Big-IP load balancer) is coupled for communication between the application servers 200 and the user systems 112 to distribute requests to the application servers 200. In one embodiment, the load balancer uses a "least connections" algorithm to route user requests to the application servers 200. Other examples of load balancing algorithms, such as round robin and observed response time, also can be used. For example, in certain embodiments, three consecutive requests from the same user could hit three different application servers 200, and three requests from different users could hit the same application server 200. In this manner, system 116 is multi-tenant and handles storage of, and access to, different objects, data and applications across disparate users and organizations.

As an example of storage, one tenant might be a company that employs a sales force where each salesperson uses system 116 to manage their sales process. Thus, a user might maintain contact data, leads data, customer follow-up data, performance data, goals and progress data, etc., all applicable to that user's personal sales process (e.g., in tenant data storage 122). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be shared organization-wide or accessible by a plurality of users or all of the users for a given organization that is a tenant. Thus, there might be some data structures managed by system 116 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 116 might also maintain system level data usable by multiple tenants or other data. Such system level data might include industry reports, news, postings, and the like that are sharable among tenants.

In certain embodiments, user systems 112 (which may be client systems) communicate with application servers 200 to request and update system-level and tenant-level data from system 116 that may require sending one or more queries to tenant data storage 122 and/or system data storage 124. System 116 (e.g., an application server 200 in system 116) automatically generates one or more SQL statements (e.g., one or more SQL queries) that are designed to access the desired information. System data storage 124 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, entitled Custom Entities and Fields in a Multi-Tenant Database System, is hereby incorporated herein by reference, and teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for adding records to a user account in a database, comprising:

identifying at least one record stored in the database in response to a query from a registered user of the database, the query having search criteria for identifying records stored in the database that have contact information including an address located within a defined distance of a specified location, the registered user having a user account for purchasing and maintaining records in the database;

transmitting instructions to the user for rendering a map of the specified location on a display along with a representation of the identified record in response to identifying the at least one record, the displayed representation of the identified record including contact information and a widget configured to enable the user to purchase the identified record upon selection of the widget, at least some of the contact information of the identified record included in the displayed representation of the identified record being obscured in the representation of the identified record;

executing a purchase transaction for the identified record in response to selection of the widget included in the displayed representation of the identified record by the user, wherein the user account is debited for the purchase transaction and the identified record is associated with the user account; and transmitting, upon completion of the purchase transaction, instructions to the user for modifying the representation of the identified record on the map to reveal the obscured contact information.

2. The method of claim 1, further comprising:

identifying a plurality of records stored in the database that satisfy the search criteria, a first set of the identified records are not associated with the user account, and a second set of the identified records are associated with the user account; and transmitting instructions to the user for rendering a first type of representation onto the map for each identified record in the first set and for rendering a second type of representation onto the map for each identified record in the second set, at least some of the contact information being obscured in each first type of representation and the contact information being revealed in each second type of representation, each first type of representation including a widget configured for enabling the user to purchase the identified record.

3. The method of claim 2, further comprising:
transmitting instructions to the user for rendering a plurality of icons onto the map, each icon corresponding to one of the identified records; and
transmitting, upon receiving a selection of one of the icons, instructions for rendering the first type of representation with obscured contact information onto the map if the corresponding record is in the first set or rendering the second type of representation with revealed contact information onto the map if the corresponding record is in the second set.

4. The method of claim 3, the instructions for rendering a plurality of icons further comprising instructions for rendering a first type of icon having a first visual attribute if the corresponding record is in the first set and for rendering a second type of icon having a second visual attribute if the corresponding record is in the second set.

5. The method of claim 4, wherein the first visual attribute is a first color and the second visual attribute is a second color that is visually distinct from the first color.

6. The method of claim 1, further comprising obtaining the specified location based on user input.

7. The method of claim 1, further comprising obtaining the specified location from geolocation software running on a user device.

8. The method of claim 1, further comprising debiting the user account based on credits available to the user from the database or funds available from the user.

9. A system for adding records to a user account in a database, comprising:
a processor; and
a non-transitory computer readable medium storing a plurality of instructions, which when executed, cause the one or more processors to:
identify at least one record stored in the database in response to a query from a registered user of the database, the query having search criteria for identifying records stored in the database that have contact information including an address located within a defined distance of a specified location, the registered user having a user account for purchasing and maintaining records in the database;
transmit instructions to the user for rendering a map of the specified location on a display along with a representation of the identified record in response to identifying the at least one record, the displayed representation of the identified record including contact information and a widget configured to enable the user to purchase the identified record upon selection of the widget, at least some of the contact information of the identified record included in the displayed representation of the identified record being obscured in the representation of the identified record;
execute a purchase transaction for the identified record in response to selection of the widget by the user, wherein the user account is debited for the purchase transaction and the identified record is associated with the user account; and
transmit, upon completion of the purchase transaction, instructions to the user for modifying the representation of the identified record on the map to reveal the obscured contact information.

10. The system of claim 1, wherein the instructions further cause the processor to:
identify a plurality of records stored in the database that satisfy the search criteria, a first set of the identified records are not associated with the user account, and a second set of the identified records are associated with the user account; and
transmit instructions to the client device for rendering a first type of representation onto the map for each identified record in the first set and for rendering a second type of representation onto the map for each identified record in the second set, at least some of the contact information being obscured in each first type of representation and the contact information being revealed in each second type of representation, each first type of representation including a widget configured for enabling the user to purchase the identified record.

11. The system of claim 10, wherein the instructions further cause the processor to:
transmit instructions to the client device for rendering a plurality of icons onto the map, each icon corresponding to one of the identified records; and
transmit, upon receiving a selection of one of the icons, instructions for rendering the first type of representation with obscured contact information onto the map if the corresponding record is in the first set or rendering the second type of representation with revealed contact information onto the map if the identified record is associated with the second set.

12. The system of claim 11, wherein the instructions further cause the processor to transmit instructions for rendering a first type of icon having a first visual attribute if the corresponding record is in the first set and for rendering a second type of icon having a second visual attribute if the corresponding record is in the second set.

13. The system of claim 9, wherein the instructions further cause the processor to obtain the specified location from the client device.

14. A computer program product comprising computer-readable program code to be executed by one or more processors when retrieved from a non-transitory computer-readable medium, the program code including instructions to:
identify at least one record stored in the database in response to a query from a registered user of the database, the query having search criteria for identifying records stored in the database that have contact information including an address located within a defined distance of a specified location, the registered user having a user account for purchasing and maintaining records in the database;
transmit instructions to the user for rendering a map of the specified location on a display along with a representation of the identified record in response to identifying the at least one record, the displayed representation of the identified record including contact information and a widget configured to enable the user to purchase the identified record upon selection of the widget, at least some of the contact information of the identified record included in the displayed representation of the identified record being obscured in the representation of the identified record;

execute a purchase transaction for the identified record in response to selection of the widget by the user, wherein the user account is debited for the purchase transaction and the identified record is associated with the user account; and transmit, upon completion of the purchase transaction, instructions to the user for modifying the representation of the identified record on the map to reveal the obscured contact information included in the representation of the identified record.

15. The computer program product of claim 14, the program code further including instructions to:

identify a plurality of records stored in the database that satisfy the search criteria, a first set of the identified records are not associated with the user account, and a second set of the identified records are associated with the user account; and transmit instructions to the client device for rendering a first type of representation onto the map for each identified record in the first set and for rendering a second type of representation onto the map for each identified record in the second set, at least some of the contact information being obscured in each first type of representation and the contact information being revealed in each second type of representation, each first type of representation including a widget configured for enabling the user to purchase the identified record.

16. The computer program product of claim 15, the program code further including instructions to:

transmit instructions to the client device for rendering a plurality of icons onto the map, each icon corresponding to one of the identified records; and transmit, upon receiving a selection of one of the icons, instructions for rendering the first type of representation with obscured contact information onto the map if the identified record is in the first set or rendering the second type of representation with revealed contact information onto the map if the identified record is in the second set.

17. The computer program product of claim 16, the program code further including instructions for rendering a first type of icon having a first visual attribute if the corresponding record is in the first set and for rendering a second type of icon having a second visual attribute if the corresponding record is in the second set.

* * * * *